May 15, 1951 M. E. BROWN ET AL 2,553,436
FUSE TESTING APPARATUS

Filed Aug. 19, 1944 2 Sheets-Sheet 1

INVENTORS
MORRIS E. BROWN
PARKER B. WICKHAM
CHARLES J. STERENBERG
SAMUEL A. JOHNSTON
BY
R G Richardson ATTY.

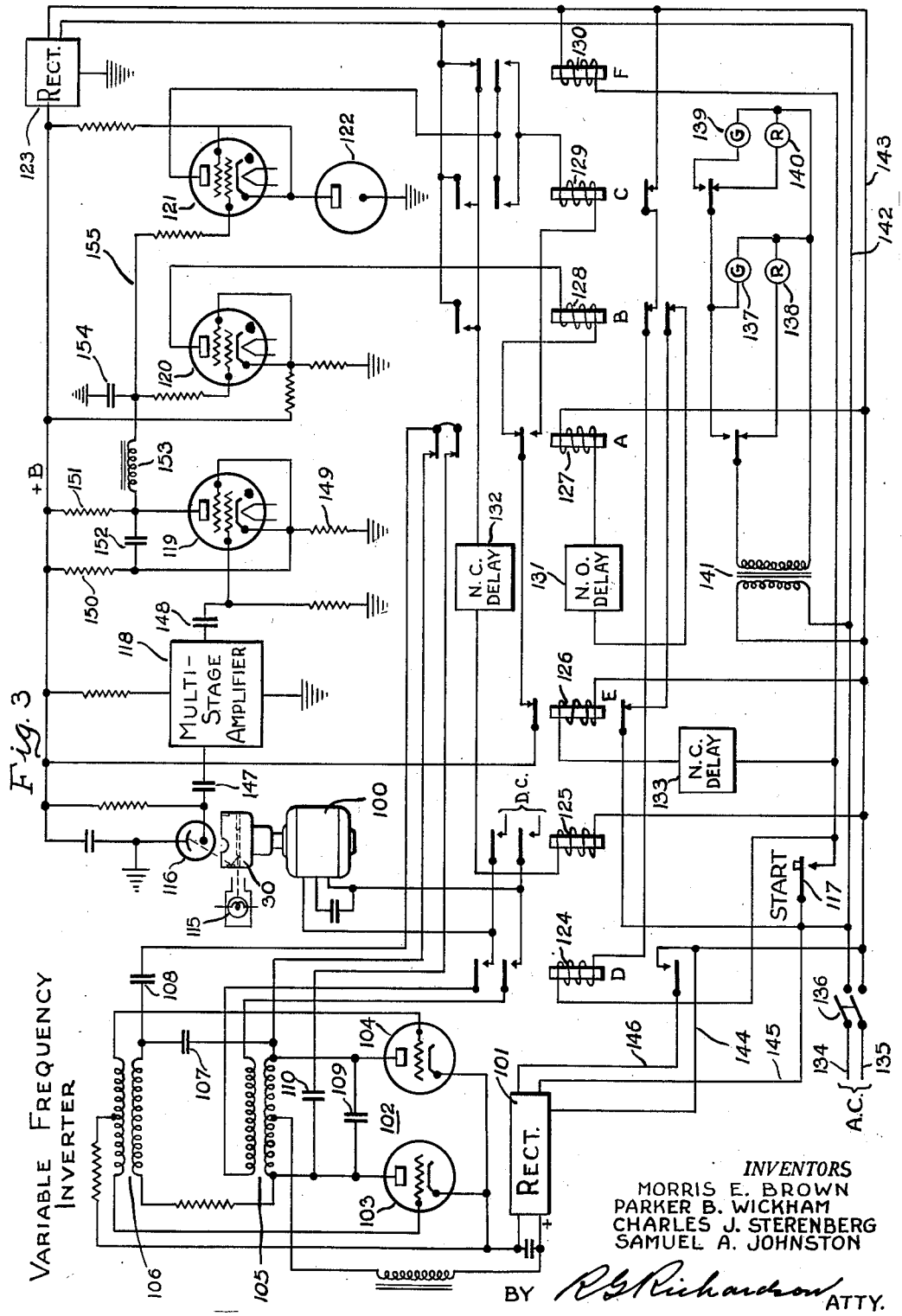

Patented May 15, 1951

2,553,436

UNITED STATES PATENT OFFICE 2,553,436

FUSE TESTING APPARATUS

Morris E. Brown, Parker B. Wickham, and Charles J. Sterenberg, Delavan, and Samuel A. Johnston, Fontana, Wis., assignors to The George W. Borg Corporation, Chicago, Ill., a corporation of Delaware Application August 19, 1944, Serial No. 550,302

13 Claims. (Cl. 73—167)

The present invention relates in general to fuse testing apparatus and more in particular to apparatus for testing fuses of the type which includes arming mechanism operated by centrifugal force.

A fuse of this type may have, for example, two arming members adapted to be operated by centrifugal force when the projectile in which the fuse is used is fired and which are normally locked by means of detents. These detents are also arranged so as to be operated by centrifugal force and function to unlock the arming members when a certain desired rotational speed is attained. The testing operation consists in spinning the fuse at a speed which is the lower limit of a predetermined speed range including the desired speed and again at a speed which is the upper limit of the range, and in checking or testing the fuse while rotating at each speed to determine if the arming members have operated or not.

A feature of the invention is the use of an optical system including a photocell for generating a train of electrical impulses responsive to rotation of a fuse being tested. The optical system includes a light path which is blocked by the arming members when they operate and the resulting cessation of the impulses is employed to indicate that the operation of the arming members has taken place.

The foregoing and other features of the invention will be explained more fully hereinafter, reference being had to the accompanying drawings, in which—

Fig. 3 is a diagrammatic circuit drawing of the complete testing apparatus.

Figure 1:
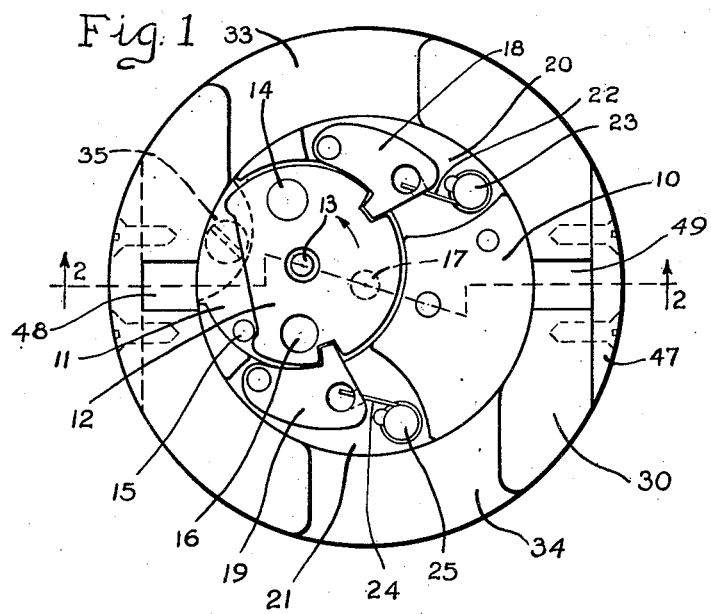
Fig. 1 is a plan view of a chuck for holding and rotating fuses for testing the same, said figure also showing a fuse held in the chuck.
Figure 2:
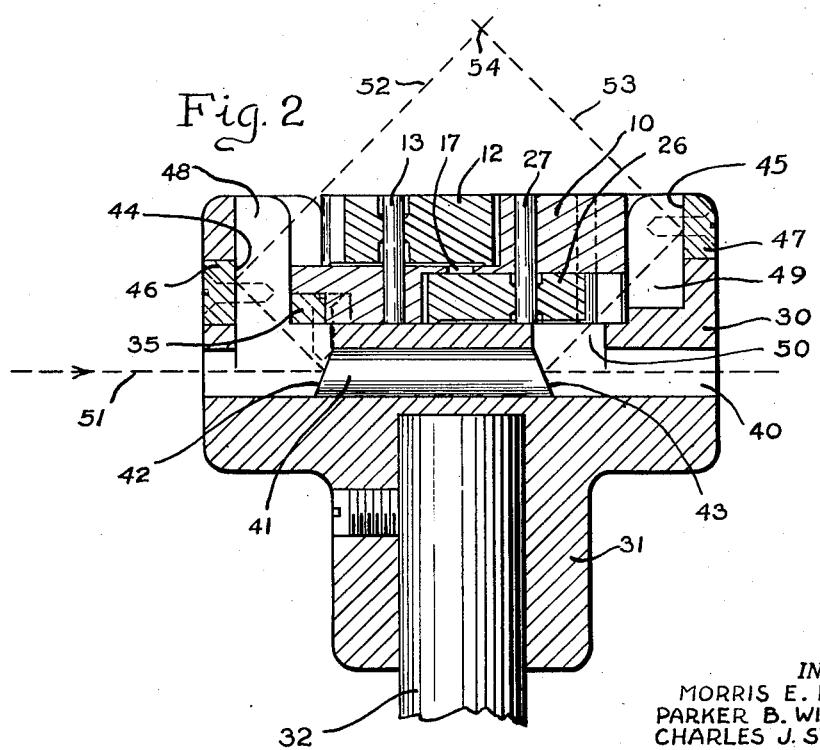
Fig. 2 is a section through the chuck and fuse on the line 2—2, Fig. 1.

The scale of the drawings, Fig. 1 and 2, is 2 to 1, that is, the parts are shown twice their actual size.

Referring to the drawings, the fuse comprises a main body portion which may be a die casting having the general form of a thick disc or short cylinder. As seen in Fig. 1 the body or disc 10 has a recess 11 on one side in which the arming member 12 is rotatably mounted on the pin 13. The arming member 12 has a circular formation except for a segment that is cut away at the outside, and is provided with a lead insert 14 for rotating it. When free to move, the arming member 12 rotates in a counter-clockwise direction as seen in Fig. 1 until its movement is arrested by the stop pin 15. In this position of the arming member the opening 16, which may contain an explosive charge, is in alignment with the central opening 17 in the fuse body 10.

The arming member 12 is normally locked in the position in which it appears in Fig. 1 by means of the two detents 18 and 19 which are pivotally mounted in two shallow recesses 20 and 21 which intersect the somewhat deeper recess 11. The detents 18 and 19 are restrained against movement to unlock the arming member 12 by two coiled springs 22 and 24 which are mounted on the studs 23 and 25, respectively. These springs have the proper tension so as to prevent movement of the detents to unlock the arming member until the fuse is rotated at the desired predetermined speed.

The other side of the fuse is substantially the same as the side which is shown. That is, the fuse is provided on the other side with an arming member 26 which is rotatably mounted on the pin 27, Fig. 2. The arming member 26 is similar to arming member 12 and is normally locked by means of spring restrained detents in the same way. It should be mentioned also that the arming member 26 has an opening (not shown) which corresponds to the opening 16 in arming member 12 and which becomes aligned with the opening 17 in the fuse body when the arming member 26 is in operated position.

The chuck for holding and rotating the fuse is indicated at 30 and is provided with a hub 31 by means of which it is attached to the motor shaft 32. The chuck and hub may be machined from a piece of cold rolled steel. The chuck has a centrally located circular depression or recess at the top for receiving the fuse. This recess should be of the proper size to afford a snug fit for the fuse while permitting it to be readily inserted and removed. The wall of the recess in the chuck is cut away at 33 and 34 to about half the depth of the recess so that the operator can easily grasp the seated fuse with her forefinger and thumb when it is desired to remove the fuse from the chuck.

At the bottom of the recess in the chuck there is a rounded ledge 35 which fits into a corresponding depression in the bottom side of the fuse when the latter is properly inserted in the chuck. The purpose of this construction is to properly orient the fuse in the chuck and to prevent relative rotation between the chuck and the fuse. The ledge could be formed integrally with the chuck but since this would involve manufacturing difficulties it is preferably made as a separate piece and is retained in the recess at the proper point by a countersunk machine screw. The ledge is shown in Fig. 2, and with the screw for holding it in place is shown by dotted lines in Fig. 1.

The chuck is provided with a system of mirrors by means of which a light beam may be directed alternately over two paths which are adapted to be interrupted by the operation of the arming members such as 12 and 26 of a fuse which is being tested. This mirror system will now be described briefly.

There are four mirrors, or reflecting surfaces, indicated at 42, 43, 44 and 45. The mirrors 42 and 43 are formed at the opposite ends of a brass rod 41 which is located in a diametral bore 40. The mirrors 44 and 45 are formed on the inner surfaces of segments 46 and 47, respectively, which are located in slots milled in the outer wall of the chuck. These segments may be of identical shape and size. The reflecting surfaces may be formed in any suitable manner. The surfaces may be lapped to a smooth finish, then nickel plated and polished, after which a plating of rhodium may be applied.

The necessary light passages are provided by channels milled in the body of the chuck. The vertical channel 48 intersects the bore 40 and the slot in which the mirror segment 46 is located, forming a light passage associated with mirrors 42 and 44. The vertical channel 49 intersects the slot in which the mirror segment 47 is located and forms part of a light passage associated with mirrors 43 and 45, said passage also including an opening 50 connecting the fuse receiving recess in the chuck with the bore 40.

The direction taken by light beams passing through the chuck and fuse is shown by the dotted lines. A fixed light source, shown in Fig. 3, is arranged to direct a light beam along the radial line 51. During rotation of the chuck and fuse this light beam impinges on the outer wall of the chuck, except in two particular positions thereof, and produces no effect. In the position in which the chuck is shown in the drawing, the bore 40 is in alignment with the line 51 and the light beam is picked up by mirrors 42 and 44 and is reflected over the line 52. After the chuck has rotated 180 degrees, the bore 40 again becomes aligned with line 51 and the light beam is picked up by mirrors 43 and 45, which reflect it over the line 53. The lines 52 and 53 intersect at the point 54. A photocell, shown in Fig. 3, is located approximately at the intersection 54, where its cathode can intercept the reflected light beams.

Referring now to Fig. 3, the reference character 100 indicates the motor for rotating the chuck, which may be any suitable type of A. C. motor, adapted to run with its shaft in a vertical position. A synchronous motor is to be preferred, but an induction motor can be used, since the load is uniform and very small.

Power for operating the motor 100 may be supplied by means of a rectifier 101 and a variable frequency inverter 102. The inverter is of the self-excited parallel type and comprises two type FG67 Thyratron tubes, the output transformer 105, the grid control transformer 106 and certain other circuit elements as shown.

In testing a fuse, the motor 100 is required to run at two different speeds, as mentioned before. It may be assumed that the low speed is 3000 R. P. M. and that the high speed is 4500 R. P. M., these being the speeds which are appropriate for testing the particular fuse shown herein. The inverter is accordingly required to have two output frequencies, which should be 50 cycles per second and 75 cycles per second, assuming that a 2 pole motor is used.

The output frequency of the inverter is determined by the capacity in series with the primary winding of the transformer 106. The two condensers 107 and 108 are normally connected in parallel in this circuit and effectively tune the circuit to a frequency of 50 cycles per second. The output frequency of the inverter, therefore, is 50 cycles per second when both condensers are in circuit. In order to change the output frequency to 75 cycles per second the condenser 108 is disconnected, leaving condenser 107, which has the proper capacity to cause the inverter to operate at 75 cycles per second.

Means is also provided for changing the capacity of the commutating condenser, since the value of this capacity for the best operation depends on the output frequency. The condenser 109 has the proper capacity of an output frequency of 75 cycles per second. When the inverter is operating at a frequency of 50 cycles per second the condenser 110 is connected in parallel with condenser 109, thereby increasing the capacity to the value which is suitable for the lower frequency.

If a synchronous motor is used the motor speed will, of course, correspond exactly to the output frequency of the inverter. If an induction motor is used the motor speed will be somewhat too low, due to slippage, and it will be necessary to increase the output frequency of the inverter. In practice it has been found convenient to check the motor speed with a stroboscope and adjust the output frequencies of the inverter until the motor runs at the desired low and high speeds. Two small variable condensers may be connected in parallel with the condensers 107 and 108, respectively, for this purpose, if desired. Or the proper capacities for the two speeds may be determined by the use of a variable capacity and condensers having the correct capacity value may then be installed.

The reference character 115 indicates a light source, which may be of any suitable character, such as a small electric lamp, for example. A photo cell is indicated at 116. Since the photocell must be shielded from light except the light received from the source 115, a suitable means for accomplishing this result must be provided, as will be understood. This means is not shown but preferably takes the form of a hinged guard such as is shown, for example, in the Patent No. 2,360,053, granted October 10, 1944. The guard also has the function of protecting the operator from injury in case a fuse should break, although the danger from this source is not great, due to the rather low rotative speeds employed.

The light source 115 may be located inside the guard, if desired, and in this case will be provided with suitable shielding means for restricting the light emitted to a path extending along the line 51, Fig. 2. The light source may, however, be located outside the guard, in which case a suitable opening is provided in the guard to admit the light beam.

As shown in the patent above referred to, the start switch 117 may be arranged to be operated by the guard.

A suitable multi-stage amplifier is indicated at 118 and is provided for amplifying the output of the photocell 116.

The tubes 119, 120 and 121 are preferably type 2050 Thyratron tubes and function in the testing operations, as will be described presently. Tube 122 may be a type VR 150-30 voltage regulating tube.

The rectifier 123 provides direct current for the photocell 116, the amplifier 118, and the Thyratron tubes 119, 120 and 121.

The relays 124 to 130, inclusive, are provided for controlling the various circuits during testing operations. The functions of these relays will be explained presently.

The rectangle 131 represents what is commonly referred to as a normally open time delay device, and may be of any suitable type, capable of delaying the closure of the circuit of the relay which it controls for a predetermined time after the closure of the circuit at another point. The rectangle 132 represents a similar time delay device, which, however, is of the normally closed type, that is, the circuit to the controlled relay is normally closed through the delay device, which effects a delayed opening of the circuit. A delay device which may be arranged either to delay the opening or closure of a circuit is disclosed in the patent previously referred to. The rectangle 133 represents another normally closed time delay device.

The reference characters 137—140 indicate signal lamps for supervising the operation of the apparatus. These lamps may be supplied with low voltage current from a step down transformer 141.

Power for operating all the equipment shown may be supplied over the conductors 134 and 135, which are assumed to connect to a source of commercial alternating current supply.

The operation of testing a fuse by means of the equipment shown and described will now be explained. For this purpose it will be assumed that the apparatus is in the condition in which it is shown in Fig. 3, with the switch 136 open. The guard may also be open, so as to expose the chuck 30, and open switch 117.

When the switch 136 is closed, power is supplied to the rectifier 123 over conductors 142 and 143. These conductors also supply current to the primary winding of transformer 141, with the result that the red lamp 138 is lighted. Power is supplied to the filament circuit of the tubes in rectifier 101 over conductors 144 and 145. The plate circuit of the tubes is open at the lower contact of relay 124. After closing the switch 136 the operator will wait for about 15 seconds or more to give the rectifier tubes time to warm up.

Certain incidental operations take place following the closure of switch 136. These operations are of no importance but may be mentioned in passing. Relay 130 being deenergized, the closure of switch 136 completes a circuit for relay 125 by way of the normally closed delay device 132. Relay 125 is accordingly energized for a brief interval or until the circuit is opened at the delay device. As soon as the rectifier 123 becomes operative, the Thyratron tube 120 fires, energizing relay 129 which is included in the anode circuit of the tube. The tube remains in this condition until it is extinguished by closing the guard, as will be explained presently.

Following the above noted delay, the operator may place a fuse in the chuck, taking care that it is seated properly. The fuse will not become seated unless it is right side up and has the correct angular orientation relative to the chuck, as will be understood from the previous explanation of the construction of these parts. The guard may now be lowered, bringing the photocell 116 into operative relation to the fuse and closing the switch 117.

The closure of switch 117 completes an obvious circuit for relay 130, which energizes and closes a point in the anode circuit of the Thyratron 121. This circuit remains open for the present, however, at relay 127. Relay 130 also opens the circuit extending to the time delay device 132 and restores this device.

The switch 117 also completes a circuit for relay 126 by way of the normally closed time delay device 133. Upon energizing, relay 126 opens the anode circuit of the Thyratron tube 120 and extinguishes the tube, thereby deenergizing relay 129. The tube 120 fired as soon as the rectifier 123 became operative following the closure of switch 136, as will be recalled.

In addition to the foregoing the closure of switch 117 completes a circuit for relay 124, which energizes and supplies power to the plate circuits of the rectifier 101 over conductor 146. Conductor 145 is common to the filament and plate circuits. The rectifier 101 thereupon begins to function and supplies direct current to the inverter 102, which starts operating at the low frequency, or at 50 cycles per second.

Relay 124 also connects the output of the inverter to the motor 100, which accordingly starts up and attains full speed in about two seconds. With the inverter operating at 50 cycles per second the motor runs at 3000 R. P. M., as previously noted. The chuck and fuse are therefore rotated at the same speed.

Each time the chuck reaches the position in which it is shown in Fig. 2, light is transmitted from the light source 115 over the path 51—52 to the photocell 116, producing an impulse of current in the circuit of the photocell. Also each time the chuck reaches a position 180 degrees in advance of this position light is transmitted from the light source 115 to the photocell 116 over the path 51—53, which likewise produces an impulse in the circuit of the photocell. Thus as the result of the rotation of the chuck two impulses are produced for each complete rotation. Since the chuck makes 50 rotations per second the impulse frequency is 100 impulses per second.

The current impulses in the photocell circuit produce voltage fluctuations at the anode of the photocell, as the result of which impulses are transmitted by way of the condenser 147 to the multistage amplifier 118, where the impulses are amplified to the necessary extent. The amplified impulses are transmitted by way of condenser 148 to the control grid of the Thyratron tube 119.

The cathode of tube 119 is connected to the junction of resistors 149 and 150 and since the latter resistor has much the higher resistance the tube has a relatively low negative grid bias and is adapted to fire in response to an impulse received from the amplifier 118. The condenser 152 is normally charged; but when the tube 119 fires, the condenser discharges through the tube, reducing the potential at the anode of the tube to such a low value that the tube is extinguished. The condenser 152 then charges up again through resistors 149 and 151, the anode potential rises, and the tube is prepared to fire again on the next impulse.

It will be understood from the foregoing that tube 119 fires on each impulse received from the amplifier 118, which at the moment is transmitting impulses to the tube at the rate of 100 impulses per second. As will appear presently the impulse frequency may have different values between 50 and 150 impulses per second. Tube 119 is adapted to respond to impulses of all these frequencies, firing at the frequency of the impulses being received.

It may be pointed out now that when the tube 119 is not firing responsive to impulses (no impulses being received) the condenser 152 is substantially fully charged and the potential at the anode of the tube is substantially the same as the potential of the +B lead; whereas when the tube is firing responsive to impulses the anode potential will not rise to so high a value, due to the condenser 152 not having time to become fully charged. It may be pointed out further that the extent to which the anode potential rises while the tube 119 is firing is inversely proportionate to the frequency of the impulses, for the higher the frequency the shorter the spacing between impulses, and the shorter the periods during which the condenser 152 can accumulate its charges.

The potentials on the anode of tube 119 are transmitted through a filter comprising the inductive reactor 153 and the condenser 154 to the conductor 155 and are used to control the Thyratrons 120 and 121 which have their control grids connected to this conductor. Due to the filter, the voltage on conductor 155 is fairly constant at a value which depends on the frequency at which the tube 119 is firing. The constants of the circuits of tube 119 are so selected that the tube will not only fire on impulses of any of the specified frequencies but will also produce a good range of voltages on the conductor 155 corresponding to the different frequencies. As an example of values that can be used it may be stated that good results have been obtained with resistors 149, 150 and 151 having resistances of 2500, 100,000 and 150,000 ohms, respectively, and a condenser 152 having a capacity of .15 micro-farad, the anode voltage being between 250 and 300 volts.

It will be recalled now that the circuit of relay 126 was closed through the normally closed time delay device 133. After the lapse of a predetermined time, which is long enough for the motor 100 to reach its full running speed, the delay device 133 opens the circuit of relay 126 and this relay deenergizes. At its lower contact relay 126 closes a circuit for relay 127 by way of the normally open time delay device 131; or rather, relay 126 starts the functioning of the time delay device, where the circuit of relay 127 remains open for the time being. At its upper contact relay 126 completes the anode circuit of the Thyratron tube 120.

The last operation above mentioned initiates the low speed test of the fuse. The grid bias on tube 120 is so adjusted that the tube can discriminate between the voltage produced on conductor 155 by impulses having a frequency of 100 impulses per second and the higher voltage which is produced by impulses having a frequency of 50 impulses per second; that is, the tube 120 fires responsive to impulses of the lower frequency but does not fire responsive to impulses of the higher frequency. Now if the fuse is properly adjusted the arming members are not released when the fuse is rotated at the low speed and at the time the test is initiated, therefore, impulses are being generated at the rate of 100 impulses per second. It follows that the tube 120 does not fire if the fuse is properly adjusted for non-operation of the arming members at low speed.

If the fuse is not properly adjusted one or both of the arming members may operate at low speed. If only one arming member operates one of the light paths 51—52 or 51—53 will be interrupted and impulses will continue to be generated but at the reduced frequency of 50 impulses per second. If both arming members operate both light paths will be interrupted and the generation of impulses will cease. In either case the Thyratron tube 120 will fire, for if it will fire on the voltage produced by impulses having a frequency of 50 impulses per second, as pointed out above, it will fire on the full +B potential which is on conductor 155 at a time when no impulses are being received.

It will be assumed now that the fuse is defective, one or both of the arming members having operated at low speed. When relay 126 deenergizes, therefore, and closes the anode circuit of tube 120, the tube fires, energizing relay 128. At its lowermost contact relay 128 opens the circuit to the delay device 131. At its next lower contact relay 128 opens the circuit of relay 124, which falls back to stop the rectifier 101 and inverter 102 and to disconnect the inverter from the motor 100. Finally, at its upper contacts relay 128 closes a circuit for relay 125 by way of the normally closed time delay device 132. Relay 125 accordingly energizes and connects the motor 100 to a source of direct current, thereby stopping the motor very quickly. After a short interval, about one second or thereabouts, the delay device 132 opens the circuit of relay 125 and the relay deenergizes.

Throughout the test that has been made the red signal lamp 138 has remained lighted and its failure to go out, coupled with the stopping of the motor, indicates to the operator that the fuse is defective. She will accordingly raise the guard and take out the fuse, which is placed with other fuses, if any, which have been rejected for the same reason, that is, failure to pass the low speed test.

When the guard is raised the switch 117 is opened automatically and relay 130 is deenergized. In addition the delay device 133, which has been operated to open the circuit of relay 126, is released or recycled to restore the relay circuit to its normally closed condition at the delay device. Relay 124, the circuit of which is controlled by switch 117, has already been deenergized by the operation of relay 128, which continues in its energized condition.

The operator may now take another untested fuse and seat it in the chuck. The guard is then lowered, operating the switch 117. The closure of the switch is followed by the same results as before, including the energization of relays 130 and 126. Relay 130 prepares the anode circuit for tube 121. Relay 126 opens the anode circuit of tube 120 whereupon the tube is extinguished and relay 128 is deenergized. Relay 130 being energized, the deenergization of relay 128 opens the circuit to the delay device 132, which restores to normally closed condition. The switch 117 now being closed, the deenergization of relay 128 closes the circuit of relay 124, which energizes to start the rectifier 101 and the inverter 102. Relay 124 also connects the inverter 102 to the motor 100, which comes up to speed and rotates the fuse in order to test the same as already explained.

It will be assumed now that the second fuse is correctly adjusted so far as non-operation of the arming members at low speed is concerned. It follows that impulses are generated at a frequency of 100 impulses per second; and that when relay 126 falls back, as the result of the operation of the delay device 133, to close the anode circuit of tube 120, the said tube is prevented from firing, for reasons previously explained.

The deenergization of relay 126 brings about the delayed closure of the circuit of relay 127, by operation of the normally open time delay device 131. Upon energizing, relay 127, at its lowermost contacts, opens the circuit of red lamp 138 and closes the circuit of the green lamp 137. These two lamps are associated with the low speed test and the extinguishing of the red lamp and lighting of the green lamp informs the operator that the fuse has passed the low speed test.

At its adjacent upper contacts relay 127 opens the anode circuit of tube 120 and closes the anode circuit of tube 121. The latter tube is thus made operative to perform the high speed test.

At its uppermost contacts relay 127 disconnects the condensers 108 and 110, causing the inverter to increase its output frequency from 50 cycles per second to 75 cycles per second. The motor accordingly speeds up and runs at 4500 R. P. M.

If the fuse is properly adjusted the arming members operate as the motor is increasing its speed, that is, both arming members will be operated by the time the motor speed reaches 4500 R. P. M. Until the arming members operate impulses of various frequencies are generated. If the fuse is so defective that both arming members fail to operate even at the maximum speed, the impulse frequency will increase from 100 impulses per second to 150 impulses per second, as the motor speeds up. The latter frequency is the highest possible frequency. The lowest frequency is produced in the case where one arming member operates shortly after the motor begins to speed up, and may be only slightly higher than 50 impulses per second.

The tube 121 is arranged to fire only if the fuse is properly adjusted, that is, if both arming members operate by the time the test speed of 4500 R. P. M. is reached. Accordingly the grid bias is so adjusted that the tube will fire on the high voltage developed on conductor 155 when no impulses are being received but will not fire on the voltage produced in response to impulses having a frequency of 50 impulses per second. Thus if any impulses at all are received when the fuse is being rotated at high speed the tube will not fire. Since tube 121 must not fire responsive to impulses of a frequency of 50 impulses per second, whereas tube 120 fires responsive to such impulses, tube 121 must have a somewhat higher negative grid bias than tube 120. The necessary bias could be obtained by means of a high resistance cathode resistor, but the resistance of such resistor would have to be so high that there would be danger of extinguishing the tube. The voltage regulating tube 122 is used, therefore, instead of a cathode resistor, and provides the proper grid bias while allowing the requisite amount of current to flow.

It will be assumed that the fuse now being tested, having passed the low speed test, is also able to pass the high speed test. Both arming members operate, therefore, the generation of impulses ceases, and the tube 121 fires. Relay 129 accordingly energizes and at its lowermost contacts opens the circuit of red lamp 140, which was closed at the start of the high speed test, and closes the circuit of the green lamp 139. The lamps 139 and 140 are associated with the high speed test and the change from red to green notifies the operator that the fuse has passed the test.

At its upper adjacent contacts relay 129 closes its own circuit over a path which is independent of the contacts of relay 130, whereby relay 129 may be maintained energized after relay 130 has deenergized.

At its adjacent lower contacts relay 129 opens the circuit of relay 124, whereupon this relay deenergizes and stops the inverter 102 and cuts off the power to the motor 100 as previously explained.

Finally, at its uppermost contacts, relay 129 closes a temporary energizing circuit for relay 125, by way of the time delay device 132, whereby relay 125 is energized long enough to stop the motor 100.

The operator may now raise the guard and remove the tested fuse from the chuck. Since the fuse has successfully passed both tests it is placed with other tested fuses found to be in the proper condition of adjustment.

When the guard is raised, the switch 117 opens as before. Relay 130 accordingly deenergizes, but relay 129 remains energized, due to having closed its circuit over a path which is independent of relay 130, as previously mentioned. The opening of switch 117 also restores the time delay device 133.

The apparatus is now ready for testing another fuse. After the next fuse has been inserted in the chuck, the guard is lowered and switch 117 is closed as in the previous cases, causing relay 130 to again energize. In addition the closure of the switch energizes relay 126, which brings about the deenergization of relays 127 and 129 by opening their respective circuits. Following the deenergization of relay 129 relay 124 energizes to start the inverter 102 and motor 100 and the testing operation proceeds as previously explained.

In this case it will be assumed that the fuse passes the low speed test but does not operate properly on the high speed test. One of the arming members of the fuse fails to operate at high speed, with the result that impulses continue to be generated and the tube 121 is prevented from firing.

Under the foregoing conditions relay 129 does not energize and the red lamp 140 continues to glow. This signal, and the continued running of the motor 100, notify the operator that the fuse is defective. The operator accordingly raises the guard, which opens the switch 117. Responsive to the opening of the switch, relays 124 and 130 are deenergized and the delay device 133 is restored. Relay 124, on deenergizing, stops the inverter 102 and disconnects it from the motor 100. Relay 130, on deenergizing, causes the relay 125 to energize momentarily, by means of delay device 132, to stop the motor 100.

It will be noted that whereas in previous instances the motor 100 had already stopped when the guard was raised, in the case now being discussed the guard is raised at a time when the motor is still running. Special means for stopping the motor with the guard down could be provided, but is not necessary. The switch 111 opens the instant the guard leaves its fully closed position and the relays 124 and 139 fall back very quickly, with the result that by the time the guard has been fully opened the motor has very nearly if not entirely ceased rotating.

The fuse last tested may now be removed and placed among the rejects, since it failed to pass the high speed test. Another fuse may then be inserted in the chuck and tested as described, being accepted or rejected depending on the result of the test. The testing operation proceeds in this manner until the fuses presently available for testing are all disposed of, or until it is desired to stop operations for some other reason, whereupon the switch 136 is opened. The opening of the switch stops all current consumption and restores all operated parts to normal.

The invention enables fuses to be tested accurately and expeditiously. A rate of 350 fuses or more per hour has been attained in practice.

The apparatus is also arranged so as to minimize the possibility of mistakes by the operator. In this connection, attention may be directed to the fact that the signals do not change when the guard is raised by the operator to enable her to remove a tested fuse and replace it with an untested one. If the fuse being removed from the chuck passed the tests, the green lamps 137 and 139 will both be illuminated and the operator is thereby advised that the fuse is good and disposes of it accordingly. On the other hand, if the fuse failed on either the low or high speed test the corresponding red lamp 138 or 140 will be lit, advising the operator that the fuse must be rejected. The lamps discriminate between failure on the low speed test and failure on the high speed test and the rejects may, therefore, be classified as to type of failure, which facilitates repairs and readjustment. In any event, whether the last tested fuse was good or bad, the lamps maintain their indication until the fuse has been disposed of, another fuse has been inserted, and the guard has been lowered to start another testing operation.

The invention having been described, that which is believed to be new and for which the protection of Letters Patent is desired will be pointed out in the appended claims.

We claim:

1. Apparatus for testing a fuse having arming means operated by centrifugal force, comprising means for rotating said fuse, means under control of said arming means for generating a series of electrical impulses responsive to rotation of said fuse at uniform speed, and means for determining if impulses are generated or not while the fuse is rotating, said generating means including a light source, and reflecting means for producing flashes of light from said source and transmitting them over a path adapted to be interrupted by operation of said arming means.

2. Apparatus for testing a fuse having arming means operated by centrifugal force, comprising means for rotating said fuse at two different speeds constituting the limits of a speed range which includes the speed at which said arming means is intended to operate, means under control of said arming means for generating two series of electrical impulses of different frequencies responsive to rotation of said fuse at said two different speeds, respectively, and means for determining if impulses are generated or not while the fuse is being rotated at each of said speeds, said last means including devices selectively responsive to said impulses of different frequencies.

3. Apparatus for testing a fuse having arming means operated by centrifugal force, comprising means for rotating said fuse at a speed which is lower than the correct operating speed for said fuse, means for testing said fuse to determine if said arming means has operated while the fuse is rotating at said lower speed, means including mechanism effective while said fuse remains in testing position for automatically increasing the rotational speed in case the said arming means fails to operate within a predetermined time while said fuse is rotating at said lower speed, said apparatus including means for maintaining the low speed rotation for said predetermined time, and means for testing the fuse to determine if said arming means has operated while the fuse is rotating at the increased speed.

4. Apparatus for testing a fuse having arming means operated by centrifugal force, comprising means for rotating said fuse at a speed which is lower than the correct operating speed for said arming means, means including a timing device for automatically increasing the rotational speed in case the said arming means fails to operate at said lower speed, means for supporting said fuse in the same position while rotating it at low and high speeds, and means for testing said fuse while rotating at each speed to determine operation or non-operation of said arming means.

5. Apparatus for testing a device having two parts adapted to be operated by centrifugal force responsive to rotation of the device, comprising means for rotating said device, means responsive to rotation of said device for generating electrical impulses having one frequency if one of said devices has operated and a different frequency if neither of said parts has operated, and testing means responsive to impulses of one frequency but not responsive to impulses of another frequency.

6. Apparatus for testing a fuse having an arming member operated by centrifugal force when the fuse is rotated, comprising a rotatable chuck for holding and rotating said fuse, said chuck having an opening in the wall thereof, a light source, reflecting means in said chuck adapted to pick up light flashes from said source at times when said opening comes into alignment with said source during rotation of the chuck, said flashes being reflected over a path which is adapted to be blocked by operation of said arming member, and a photocell for intercepting said light flashes.

7. Apparatus for testing a fuse having two arming members operated by centrifugal force when the fuse is rotated, comprising a chuck for holding and rotating said fuse, a light source, a photocell, means including light passages and reflecting surfaces in said chuck for transmitting light from said source to said photocell alternately over two paths adapted to be blocked by operation of said arming members, respectively, means including said photocell for generating electrical impulses responsive to light flashes received over said paths during rotation of the chuck and fuse, and testing means controlled by said impulses.

8. Apparatus for testing a device having a part operated by centrifugal force responsive to rotation of the device, comprising means for rotating said device, a switch for starting the operation of said rotating means, testing means for detecting the operation of said part, signalling means controlled by said testing means to indicate the result of the test, means for stopping the rotation of said device while maintaining said signalling means in operated condition, and means responsive to opening and closing of said switch for restoring said signalling means.

9. Apparatus for testing a device having a plurality of parts adapted to be operated by centrifugal force, comprising means for rotating said device at a speed which is lower than the speed at which said parts are intended to operate, means for generating a series of electrical impulses concurrently with the rotation of said device, said generating means including means whereby the operation of one of said parts is effective to reduce the frequency of said impulses, and testing means sensitive to such reduction in the impulse frequency for indicating that the device is defective.

10. Apparatus for testing a device having a part adapted to be operated by centrifugal force, comprising means for rotating said device at two speeds which are, respectively, lower and higher than the speed at which said part is intended to operate, means under the control of said part for generating periodic electrical impulses concurrently with the rotation of said device, said impulses having a frequency which is proportional to the rotational speed of said device, and means sensitive to the frequency of said impulses for detecting the operation of said part at low speed, if it operates at low speed, and its failure to operate at high speed, in case it does not operate at low speed and fails to operate at high speed.

11. Apparatus for testing a device having a part adapted to be operated by centrifugal force, comprising means for holding said device in a fixed position, means for rotating said device in said position at a speed which is lower than the speed at which said part is intended to operate, means operative while said device remains in said position and effective in case said part fails to operate at said lower speed for automatically increasing the speed to a value which is higher than the speed at which said part is intended to operate, and testing means responsive to the operation of said part in the event that said part operates while the rotational speed of said device is being increased.

12. In a testing apparatus, means for generating impulses varying in frequency, a gas discharge tube arranged to fire responsive to and in synchronism with said impulses, a control conductor, means including said discharge tube for maintaining a potential on said conductor which has a value depending on the frequency of said impulses, and a second gas discharge tube controlled over said conductor and arranged to fire on a potential corresponding to one impulse frequency but not on a potential corresponding to a different impulse frequency.

13. In a testing apparatus, means for generating impulses varying in frequency, a gas discharge tube arranged to fire responsive to and in synchronism with said impulses, a control conductor, means including said discharge tube for maintaining a potential on said conductor which has a value depending on the frequency of said impulses, two gas discharge tubes controlled in parallel over said conductor, and means for causing one of said last mentioned tubes to fire on a lower potential than is required to fire the other of said last mentioned tubes.

MORRIS E. BROWN.
PARKER B. WICKHAM.
CHARLES J. STERENBERG.
SAMUEL A. JOHNSTON.

REFERENCES CITED

The following references are of record in the file of this patent:

UNITED STATES PATENTS

| Number | Name | Date |
|---|---|---|
| 1,938,684 | Bond et al. | Dec. 12, 1933 |
| 2,095,124 | Cockrell | Oct. 5, 1937 |
| 2,191,185 | Wolff | Feb. 20, 1940 |
| 2,228,367 | Sanders | Jan. 14, 1941 |
| 2,307,316 | Wolff | Jan. 5, 1943 |
| 2,321,769 | Persson | June 15, 1943 |
| 2,349,501 | Kahn | May 23, 1944 |
| 2,355,092 | Meister | Aug. 8, 1944 |
| 2,358,078 | Kohlhagen | Sept. 12, 1944 |
| 2,360,053 | Gibbs | Oct. 10, 1944 |